(12) United States Patent
Lai et al.

(10) Patent No.: US 9,258,025 B2
(45) Date of Patent: Feb. 9, 2016

(54) ANTENNA STRUCTURE AND WIRELESS COMMUNICATION DEVICE USING THE SAME

(71) Applicant: Chiun Mai Communication Systems, Inc., New Taipei (TW)

(72) Inventors: Chih-Hung Lai, New Taipei (TW); Yen-Hui Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 55 days.

(21) Appl. No.: 14/287,713

(22) Filed: May 27, 2014

(65) Prior Publication Data
US 2014/0357203 A1 Dec. 4, 2014

(30) Foreign Application Priority Data
Jun. 3, 2013 (TW) .............................. 102119562 A

(51) Int. Cl.
*H04B 1/38* (2015.01)
*H04B 1/3827* (2015.01)
*H01Q 1/24* (2006.01)
*H01Q 5/371* (2015.01)
*H01Q 5/40* (2015.01)

(52) U.S. Cl.
CPC .............. *H04B 1/3827* (2013.01); *H01Q 1/243* (2013.01); *H01Q 5/371* (2015.01); *H01Q 5/40* (2015.01)

(58) Field of Classification Search
CPC ........ H04W 76/005; H04W 4/10; H04B 1/38; H04B 1/3833; H04L 29/06217; H04L 29/06442; H01Q 1/243; H01Q 1/242; H01Q 1/244; H01Q 1/084; H01Q 1/38; H01Q 9/0407; H01Q 9/0421
USPC ................ 455/78, 79, 82, 90.2, 550.1, 575.5, 455/575.7; 343/700 MS
See application file for complete search history.

(56) References Cited

U.S. PATENT DOCUMENTS

| 6,943,731 | B2 * | 9/2005 | Killen ................. | H01Q 9/0457 343/700 MS |
| 7,183,979 | B1 * | 2/2007 | Liu ...................... | H01Q 9/0442 343/700 MS |
| 7,612,724 | B2 * | 11/2009 | Kim ..................... | H01Q 1/243 343/700 MS |
| 8,085,204 | B2 * | 12/2011 | Wu ....................... | H01Q 5/25 343/700 MS |

* cited by examiner

*Primary Examiner* — Nhan Le
(74) *Attorney, Agent, or Firm* — Novak Druce Connolly Bove + Quigg LLP

(57) ABSTRACT

Antenna structure includes a feed section, a first radiator, and a second radiator. The first radiator includes a first radiation portion, a ground end, a second radiation portion, the first radiation portion is spaced from the feed end, the ground end is connected between the first radiation portion and the second radiation portion. The second radiator is located below the second radiation portion, and includes a first extending strip, a ground portion, a second extending strip, and a third extending strip. The first extending strip is spaced from the feed end, the second extending strip is connected to the first extending strip and extends along the first extending strip, and the ground portion is connected to a junction of the first extending strip, the second extending strip, and the third extending strip.

15 Claims, 4 Drawing Sheets

ANTENNA STRUCTURE AND WIRELESS COMMUNICATION DEVICE USING THE SAME

FIELD

The disclosure generally relates to antenna structures, and particularly to an antenna structure for receiving/transmitting multiband wireless signals, and a wireless communication device using the same.

BACKGROUND

Antennas are used in wireless communication devices such as mobile phones. The wireless communication device uses a multiband antenna to receive/transmit wireless signals at different frequencies.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
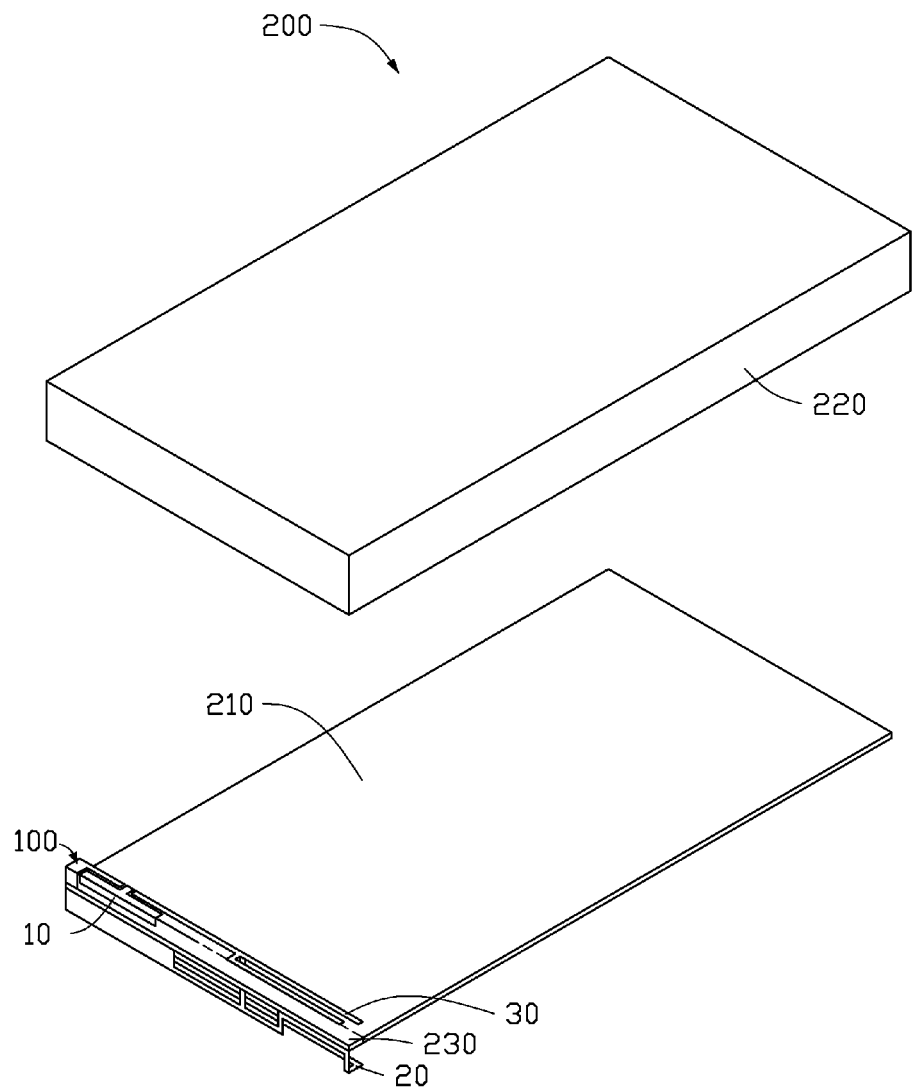
FIG. 1 is an isometric view of a wireless communication device employing an antenna structure, according to an exemplary embodiment.

FIG. 1 shows an embodiment of a wireless communication device 200 employing an antenna structure 100. The wireless communication device 200 can be a mobile phone or a personal digital assistant, for example (details not shown).

The wireless communication device 200 includes a printed circuit board (PCB) 210 and a housing 220. The antenna structure 100 is positioned on the PCB 210, and is covered by the housing 220. In the exemplary embodiment, the PCB 210 is a substantially rectangular board having a keep-out-zone 230 with a width of about 3 millimeter (mm). The purpose of keep-out-zone 230 is to not permit other elements (such as a camera, a vibrator, a speaker, etc.) on the PCB 210 to be placed in a predetermined area where it may interfere with the antenna structure 100. In the exemplary embodiment, the keep-out-zone 230 is located near an end of the PCB 210.

The antenna structure 100 includes a feed section 10, a first radiator 20, and a second radiator 30. Both the first radiator 20 and the second radiator 30 are located above the keep-out-zone 230, and positioned at two opposite sides of the PCB 210, respectively. The feed section 10 can be spaced from the first radiator 20 and the third radiator 30 to allow current to be coupled from the feed section 10 to the first radiator 20 and the third radiator 30.

Figure 2:
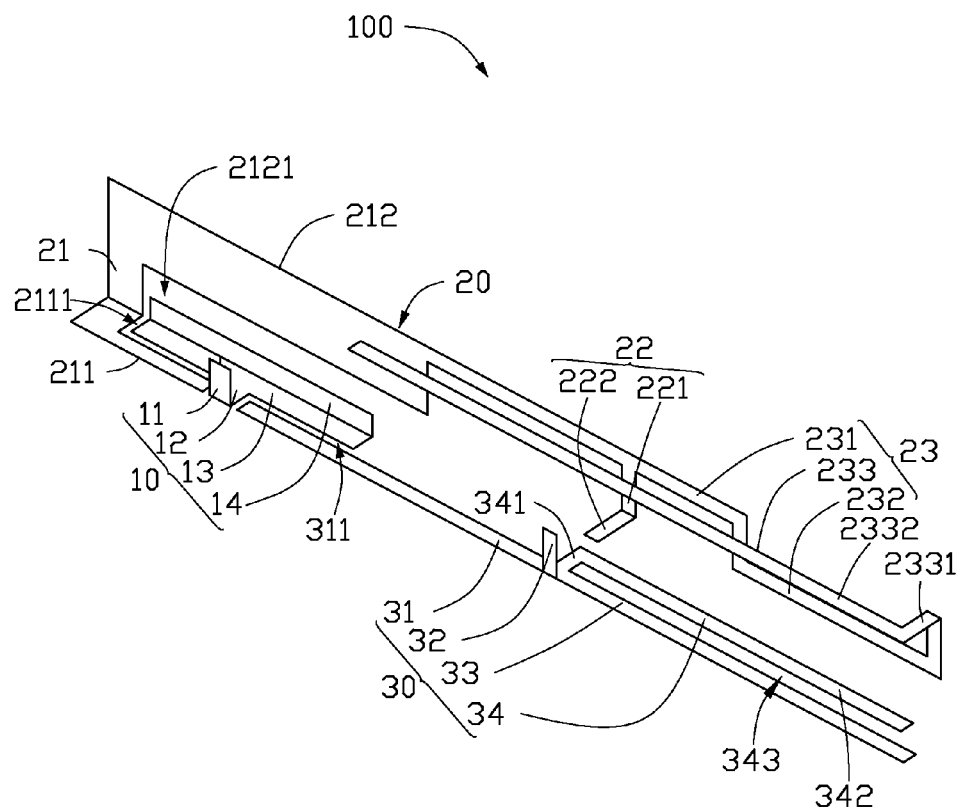
FIG. 2 is an enlarged isometric view of the antenna structure of FIG. 1.
Figure 3:
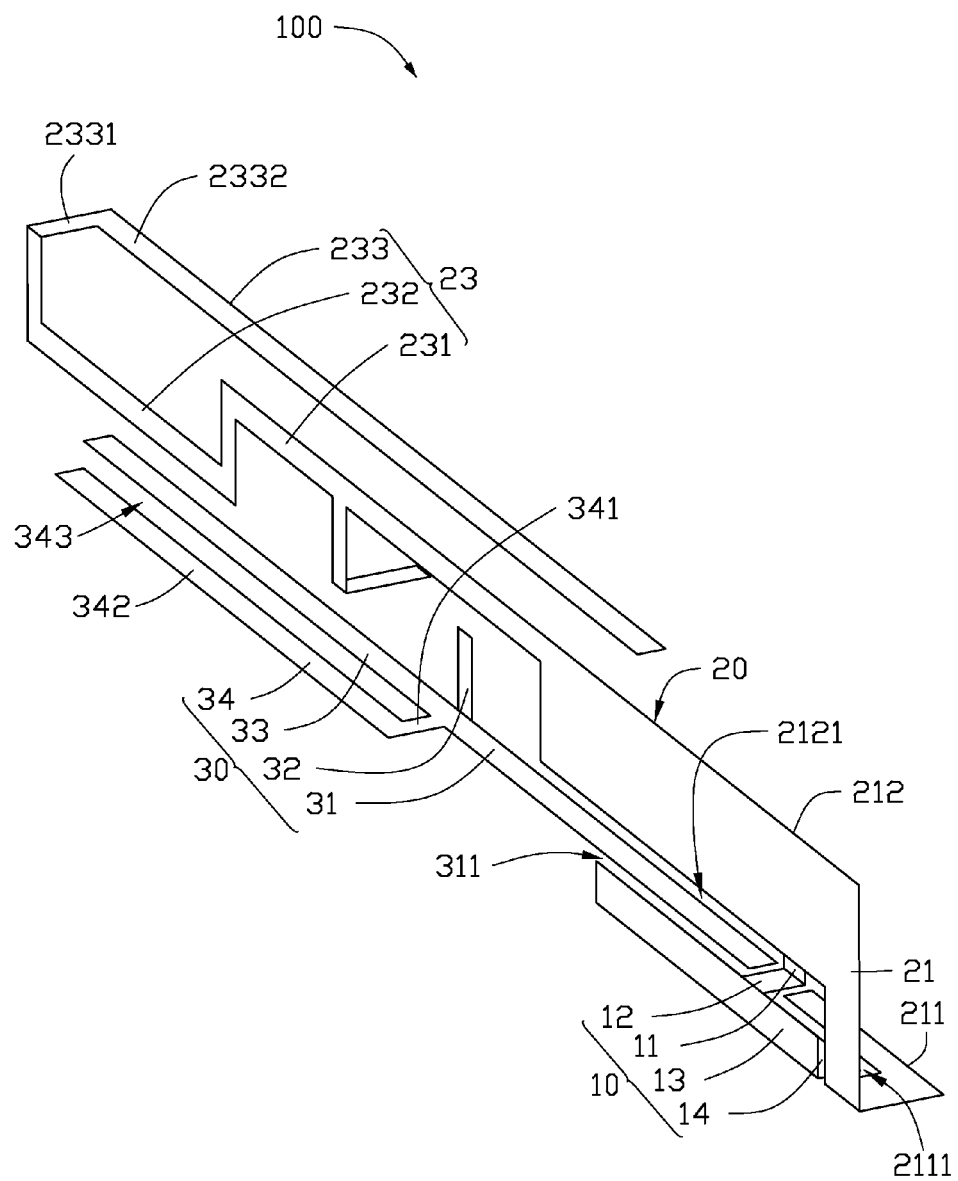
FIG. 3 is similar to FIG. 2, but shown from another aspect.

FIGS. 2 and 3 show that the feed section 10 includes a feed end 11, a middle portion 12, a first connection portion 13, and a second connection portion 14. The feed end 11 is substantially a strip, and is coupled substantially perpendicular to the PCB 210 The word of "coupled" may indicate that two elements are electronically connected to each other. The middle portion 12 is connected substantially perpendicular to the feed end 11. The first connection portion 13 is connected to an end of the middle portion 12 opposite to the feed end 11. The second connection portion 14 is connected substantially perpendicular to the first connection portion 13, and is parallel to the feed end 11.

The first radiator 20 includes a first radiation portion 21, a ground end 22, and a second radiation portion 23.

The first radiation portion 21 includes a first radiation strip 211 and a second radiation strip 212 connected to the first radiation strip 211. The first radiation strip 211 is substantially an L-shaped strip, and is substantially coplanar with the first connection portion 13. A first slot 2111 is defined among the first radiation strip 211, the middle portion 12, and the first connection portion 13. The second radiation strip 212 is substantially coplanar with the second connection portion 14, a first end of the second radiation strip 212 is connected to the first radiation strip 211, and a second end of the second radiation strip 212 is extends substantially parallel to the second connection portion 14. A second slot 2121 is defined between the second radiation strip 212 and the second connection portion 14, and communicates with the first slot 2111.

The ground end 22 includes a first ground strip 221 and a second strip 222. The first strip 221 is connected to the second radiation strip 212, and is substantially coplanar with the second radiation strip 212. The second strip 222 is coupled between the first strip 221 and the PCB 210, thereby grounding the first radiator 20.

The second radiation portion 23 includes a first connection strip 231, a second connection strip 232, and a third connection strip 233. The connection strip 231, the second connection strip 232, and the third connection strip 233 are connected in turn. The first connection strip 231 is substantially coplanar with the second connection portion 14, and is connected to a junction of the ground end 22 and the first radiation portion 21. The second connection strip 232 is substantially a U-shaped strip, and is substantially coplanar with the first connection strip 231. A plane of the third connection strip 233 is substantially perpendicular to a plane of the second connection strip 232. The third connection strip 233 includes a first extending end 2331 and a second extending end 2332. The first extending end 2331 is connected substantially perpendicular to the second connection strip 232. A first end of the second extending end 2332 is connected substantially perpendicular to the first extending end 2331, and a second end of the second extending end 2332 extends towards the ground end 22. In the exemplary embodiment, a length of the first radiation portion 21 is greater than the second radiation portion 23.

The second radiator 30 is substantially coplanar with the first connection portion 13, and is located below the second radiation portion 23. The second radiator 30 includes a first extending strip 31, a ground portion 32, a second extending strip 33, and a third extending strip 34. The first extending strip 31 is spaced from the middle portion 12, and a third slot 311 is defined between the first extending strip 31 and the first connection portion 13. The ground portion 32 is substantially parallel to the feed end 11, and is coupled between the first extending strip 31 and the PCB 210, thereby grounding the second radiator 30. The second extending strip 33 is connected to a junction of the first extending strip 31 and the ground portion 32, and extends along the first extending strip 31. The third extending strip 34 includes a first extending portion 341 and a second extending portion 342. The first extending portion 341 is connected substantially perpendicular to the first extending strip 31. The second extending portion 342 is connected to the first extending portion 341, and an extending direction of the second extending portion 342 is substantially parallel to an extending direction of the second extending strip 33. Thus, a fourth slot 343 is defined between the second extending strip 33 and the third extending strip 34.

Figure 4:
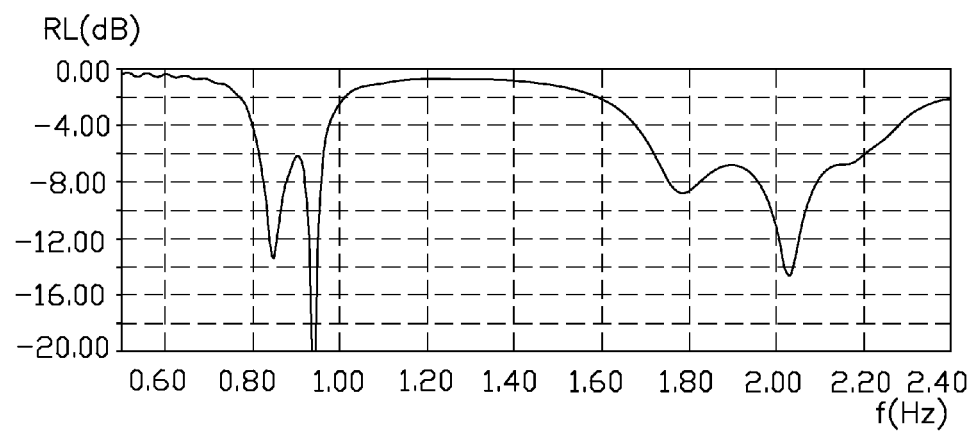
FIG. 4 is a return loss (RL) graph of the antenna structure of FIG. 1.

When current is input to the feed end 10, the current is coupled from the feed end 10 to the first radiator 20 and the second radiator 30. A first portion of the current flows to the first radiation portion 21, a second portion of the current flows to the second radiation portion 23, both of the first portion of the current and the second portion of the current are grounded via the ground end 22, thereby activating the first radiator 20 to receive and transmit wireless signals at a first bandwidth, which can be for example about 824 MHZ~894 MHZ (GSM850) and wireless signals at a second bandwidth, which can be for example about 880 MHZ~960 MHZ (GSM900). Additionally, a third portion of the current flows to the first extending strip 31, and is grounded via the ground portion 32, thereby activating the first extending strip 31 to receive and transmit wireless signals at a third bandwidth, which can be for example about 1920 MHZ~2170 MHZ (UMTS). Moreover, a fourth portion of the current flows to the second extending strip 33, thereby activating the second extending strip 33 to receive and transmit wireless signals at a fourth bandwidth, which can be for example about 1710 MHZ~1880 MHZ (DCS). Furthermore, a fifth portion of the current flows to the third extending strip 34, thereby activating the third extending strip 34 to receive and transmit wireless signals at a fifth bandwidth, which can be for example about 1850 MHZ~1990 MHZ (PCS). FIG. 4 illustrates a return loss (RL) graph of the antenna structure 100 of FIG. 1. The antenna structure 100 has good performance when operating at bandwidths of GSM850, GSM900, DCS1800, PCS1900, and UMTS2100.

In summary, the first radiator 20 and the second radiator 30 are positioned at two opposite sides of the feed end 10. Thus, the current can be simultaneously coupled from the feed end 10 to the first radiator 20 and the second radiator 30 to allow the antenna structure 100 to receive/transmit multiband wireless signals. In addition, a part of the first radiator 20 is coplanar with the second connection portion 14, the second radiator 30 is located below a second radiation portion 23, and is coplanar with the first connection portion 13. Thus, the wireless communication device 200 does not require any additional antennas, which effectively reduces a required size of the wireless communication device 200.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An antenna structure, comprising:
    a feed section;
    a first radiator comprising a first radiation portion, a ground end, and a second radiation portion, the first radiation portion spaced from the feed end, the ground end connected between the first radiation portion and the second radiation portion; and
    a second radiator located at a side of the second radiation portion, the second radiator comprising a first extending strip, a ground portion, a second extending strip, and a third extending strip, the first extending strip spaced from the feed end, the second extending strip connected to the first extending strip and extending along the first extending strip, the third extending strip connected to the first extending strip and the second extending strip, and the ground portion connected to a junction of the first extending strip, the second extending strip, and the third extending strip.

2. The antenna structure as claimed in claim 1, wherein the feed section comprises a feed end, a middle portion, a first connection portion, and a second connection portion, the feed end is connected to the middle portion, the first connection portion is connected to an end of the middle portion opposite to the feed end, the second connection portion is connected to the first connection portion, and is parallel to the feed end.

3. The antenna structure as claimed in claim 2, wherein the first radiation portion comprises a first radiation strip and a second radiation strip connected to the first radiation strip, the first radiation strip is coplanar with the first connection portion, the second connection is coplanar with the second connection portion.

4. The antenna structure as claimed in claim 3, wherein a first slot is defined on one of the first radiation strip, the middle portion, and the first connection portion, and a second slot is defined between the second radiation strip and the second connection portion, and is coupled with the first slot.

5. The antenna structure as claimed in claim 3, wherein the second radiation portion comprises a first connection strip, a second connection strip, and a third connection strip, the first connection strip is coplanar with the second connection portion, and is connected to a junction of the ground end and the first radiation portion, the second connection strip is a U-shaped strip, a plane of the third connection strip is perpendicular to a plane of the second connection strip, the third connection strip comprises a first extending end and a second extending end, the first extending end is connected to the second connection strip, a first end of the second extending end is connected to the first extending end, and a second end of the second extending end extends towards the ground end.

6. The antenna structure as claimed in claim 2, wherein the first extending strip is coplanar with the second extending strip and the third extending strip, the third extending strip comprises a first extending portion and a second extending portion, the first extending portion is perpendicularly connected to the first extending strip, the second extending portion is connected to the first extending portion, and an extending direction of the second extending portion is parallel to an extending direction of the second extending strip.

7. The antenna structure as claimed in claim 6, wherein a third slot is defined between the first extending strip and the first connection portion, and a fourth slot is defined between the second extending strip and the third extending strip.

8. A wireless communication device, comprising:
    an antenna structure comprising:
        a feed section;
        a first radiator comprising a first radiation portion, a ground end, a second radiation portion, the first radiation portion spaced from the feed end, the ground end connected between the first radiation portion and the second radiation portion; and a second radiator located below the second radiation portion, and comprising a first extending strip, a ground portion, a second extending strip, and a third extending strip, the first extending strip spaced from the feed end, the second extending strip connected to the first extending strip and extending along the first extending strip, and the ground portion connected to a junction of the first extending strip, the second extending strip, and the third extending strip.

9. The wireless communication device as claimed in claim 8, wherein the feed section comprises a feed end, a middle portion, a first connection portion, and a second connection portion, the feed end is connected to the middle portion, the first connection portion is connected to an end of the middle portion opposite to the feed end, the second connection portion is connected to the first connection portion, and is parallel to the feed end.

10. The wireless communication device as claimed in claim 9, wherein the first radiation portion comprises a first radiation strip and a second radiation strip connected to the first radiation strip, the first radiation strip is coplanar with the first connection portion, the second connection is coplanar with the second connection portion.

11. The wireless communication device as claimed in claim 10, wherein a first slot is defined on one of the first radiation strip, the middle portion, and the first connection portion, and a second slot is defined between the second radiation strip and the second connection portion, and is coupled with the first slot.

12. The wireless communication device as claimed in claim 10, wherein the second radiation portion comprises a first connection strip, a second connection strip, and a third connection strip, the first connection strip is coplanar with the second connection portion, and is connected to a junction of the ground end and the first radiation portion, the second connection strip is a U-shaped strip, a plane of the third connection strip is perpendicular to a plane of the second connection strip, the third connection strip comprises a first extending end and a second extending end, the first extending end is connected to the second connection strip, a first end of the second extending end is connected to the first extending end, and a second end of the second extending end extends towards the ground end.

13. The wireless communication device as claimed in claim 9, wherein the first extending strip is coplanar with the second extending strip and the third extending strip, the third extending strip comprises a first extending portion and a second extending portion, the first extending portion is perpendicularly connected to the first extending strip, the second extending portion is connected to the first extending portion, and an extending direction of the second extending portion is parallel to an extending direction of the second extending strip.

14. The wireless communication device as claimed in claim 13, wherein a third slot is defined between the first extending strip and the first connection portion, and a fourth slot is defined between the second extending strip and the third extending strip.

15. The wireless communication device as claimed in claim 8, further comprising a printed circuit board (PCB), wherein the PCB comprises a keep-out-zone, both of the first radiator and the second radiator are located above the keep-out-zone, and are positioned at two opposite sides of the PCB, respectively.

* * * * *